(12) United States Patent
Buzescu

(10) Patent No.: US 9,749,842 B2
(45) Date of Patent: *Aug. 29, 2017

(54) SYSTEM AND METHOD FOR THE DISTRIBUTION AND USE OF PRESENCE INFORMATION

(71) Applicant: T-Mobile USA, Inc., Bellevue, WA (US)

(72) Inventor: Adrian Buzescu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/663,916

(22) Filed: Mar. 20, 2015

(65) Prior Publication Data

US 2015/0195704 A1   Jul. 9, 2015

Related U.S. Application Data

(63) Continuation of application No. 12/345,659, filed on Dec. 29, 2008, now Pat. No. 9,037,647.

(Continued)

(51) Int. Cl.
| | |
|---|---|
| *G06F 15/16* | (2006.01) |
| *H04W 8/22* | (2009.01) |
| *H04L 29/08* | (2006.01) |
| *H04W 4/12* | (2009.01) |
| *H04W 8/18* | (2009.01) |

(52) U.S. Cl.
CPC .............. *H04W 8/22* (2013.01); *H04L 67/24* (2013.01); *H04W 4/12* (2013.01); *H04W 8/18* (2013.01)

(58) Field of Classification Search
USPC ................................. 709/204, 200, 220, 224
See application file for complete search history.

(56) References Cited

U.S. PATENT DOCUMENTS

2002/0097856 A1   7/2002 Wullert
2004/0068574 A1*  4/2004 Costa Requena ....... H04L 29/06
                                                              709/230
(Continued)

FOREIGN PATENT DOCUMENTS

EP         1696635 A2     8/2006

OTHER PUBLICATIONS

"SIP/SIMPLE Presence Specification OMA-PAG-SIMPLE-Spec-V1_0_0-20040824-D," Aug. 24, 2004, Open Mobile Alliance (OMA), 4330 La Jolla Village Drive, Suite 110, San Diego, CA—48 pages.

(Continued)

*Primary Examiner* — El Hadji Sall
(74) *Attorney, Agent, or Firm* — Han Santos, PLLC; Elliott Y. Chen

(57) ABSTRACT

A system and method are provided for automating the implementing and use of presence information in a network and/or for automatically selecting the most efficient means for sending a message. In an embodiment of the system, presence information is transmitted to a presence server. The presence server then ascertains presence information for the entries in a user's network address book after a user's device provides presence information about the user to the presence server. This presence information can then used to determine whether a message is to be sent through session based messaging (if presence information indicates that a message recipient is available) or immediate messaging (if the other user is not available or no presence information is available). A system and method is also provided to automatically send the message using an efficient protocol.

20 Claims, 4 Drawing Sheets

Related U.S. Application Data

(60) Provisional application No. 61/038,500, filed on Mar. 21, 2008, provisional application No. 61/036,500, filed on Mar. 14, 2008.

(56) References Cited

U.S. PATENT DOCUMENTS

| | | | |
|---|---|---|---|
| 2007/0083612 A1* | 4/2007 | Kim | H04L 67/1095 709/217 |
| 2007/0121867 A1 | 5/2007 | Ozugur et al. | |
| 2008/0010301 A1* | 1/2008 | Tian | H04L 67/24 |
| 2008/0013704 A1 | 1/2008 | Hyerle | |
| 2008/0133580 A1 | 6/2008 | Wanless et al. | |
| 2009/0150488 A1* | 6/2009 | Martin-Cocher | H04L 29/12047 709/204 |
| 2009/0292769 A1* | 11/2009 | Matsuzawa | G06Q 10/10 709/204 |

OTHER PUBLICATIONS

Kelley et al., "LRF-Contact Lists for Presence Authorisation Policy," OMA-PAG-2004-0365R02-LRF-GLMS-interaction-flow, Open Mobile Alliance (OMA), 4330 La Jolla Village Drive, Suite 110, San Diego, CA 92122, No. 1.0.0, Aug. 30, 2004—3 pages.

Prati et al., "XDMS-Network Address Book Enabler," IP Multimedia Subsystem Architecture and Applications, 2007 International Conference On, IEEE, Piscataway, NJ, Dec. 6, 2007—4 pages.

International Search Report and Written Opinion dated Apr. 29, 2009, for PCT International Application No. PCT/US2009/037210—7 pages.

Office Action dated Aug. 17, 2010, for U.S. Appl. No. 12/345,569—13 pages.

Final Office Action dated Apr. 26, 2011, for U.S. Appl. No. 12/345,569—17 pages.

Office Action dated Oct. 26, 2013, for U.S. Appl. No. 12/345,569—17 pages.

Final Office Action dated May 8, 2014, for U.S. Appl. No. 12/345,569—15 pages.

Notice of Allowance dated Nov. 21, 2014, for U.S. Appl. No. 12/345,569—13 pages.

European Search Report dated Jul. 17, 2013, for European Patent Application No. 09720612.2—2 pages.

Communication Pursuant to Article 94(3) EPC dated Feb. 10, 2017, for European Patent Application No. 09720612.2—8 pages.

\* cited by examiner

| | 210 | | | | | 230 | | | | 270 | | |
|---|---|---|---|---|---|---|---|---|---|---|---|---|
| | General phonebook section | | | | | MyFaves Section | | | | Presence Section | | |
| First Name | Last Name | Home Phone | Mobile Phone | ... | E-mail | MyFaves ID | MyFaves Phone Number | MyFaves UI Position | MyFaves Local Icon | Presence Permission | Toggle | Tagline | Presence Icon |
| | MyProfile | | | | myself@t-mobile.com | | | | | | | Downtown - shopping | 🖼 |
| John | Colbert | 4252220001 | 4250020001 | | john@hotmail.com | 1 | 4252220001 | 1 | 🖼 | 1 | 1 | | 🖼 |
| Mary | Heiss | 4252220020 | 4250020020 | | | 2 | 4252220020 | 3 | 🖼 | 1 | 1 | At work | 🖼 |
| Sylvia | Brown | 4252220100 | 4250020100 | | | | | | | 1 | | | |
| Eric | Coppert | 4252220031 | 4250020031 | | | 3 | 4252220031 | 2 | 🖼 | 0 | 1 | Lost my pet frog today | 🖼 |
| Brandon | Stein | 4252221200 | 4250021200 | | | 4 | 4252221200 | 5 | 🖼 | 1 | 0 | | 🖼 |
| Robert | Coburn | 4252221010 | 4250021010 | | | | | | | 0 | | | |
| Laura | Palmer | 4252220022 | 4250020022 | | | 5 | 4252220022 | 4 | 🖼 | 1 | 1 | Amsterdam is just awesome | 🖼 |

FIG. 2

SYSTEM AND METHOD FOR THE DISTRIBUTION AND USE OF PRESENCE INFORMATION

CROSS-REFERENCE TO RELATED APPLICATIONS

The present application is a continuation of and claims priority to U.S. NonProvisional patent application Ser. No. 12/345,659, filed on Dec. 29, 2008, entitled "System and Method for the Distribution and Use of Presence Information, which claims priority to U.S. Provisional Patent Application No. 61/038,500, filed Mar. 21, 2008, entitled "System and Method for a Network Address Book Service" and U.S. Provisional Patent Application No. 61/036,500, filed Mar. 14, 2008, entitled "system and Method for Enhanced Messaging," each of which, including all disclosures and specifications of which, are hereby expressly incorporated herein in their entireties by reference.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The use of cellular communications systems has increased substantially over the last decade. As the use of these systems has increased, so has the demand for additional features, such as text, chat, and multimedia messaging. Some of the features currently available on cellular communications systems are inefficient or non-intuitive, requiring a user to invest needless time and effort in either using or learning how to use a certain feature.

For example, while current technology allows users to obtain presence information over cellular communications systems, such as whether a specific device or user is available to communicate with another user, this technology is cumbersome and often requires a user to independently input information identifying the devices used by others for which presence information is sought. This independently inputted information is then uploaded from the user's device to another server typically called a Resource List Server, which then independently stores a list of users for whom presence information is sought. Independently subscribing to presence information for each potential communication partner through a user device and then relaying this information to another server is inefficient, both time and resource wise, and may be difficult for the user. The time consuming process of first learning how to input this information into a device, then actually inputting the information, and uploading it to a separate server, has impeded use of this feature. Therefore, it would be desirable to provide a system and method for automating the implementation and use of presence information in cellular communications systems.

Furthermore, while current cellular technology allows users to send various types of messages, such as text, picture, and multimedia messages, in additional to traditional aural communications, current systems require an a priori selection of the transmission method of these communications, resulting in user confusion and inefficient use of system resources. For example, if a cellular communications system user wants to send a brief text message to another user, the user must identify the message as such before it is sent so that it can be sent via SMS (Short Messaging Service). On the other hand if a user wants to send a picture to another user, the user must identify the message as a multimedia message so that it can be sent via MMS (Multimedia Messaging Service), and so on. Placing the burden on the user to select the appropriate delivery method can cause confusion, especially with an inexperienced user of the technology, and results in inefficiencies if the user selects an inappropriate method, or if the user has to regularly or repeatedly switch different delivery services. Accordingly, these limitations have impaired use of these alternative types of communication. Therefore, it would be desirable to provide a system and method for automating the selection of the delivery method of various types of communications transmitted over cellular communications systems, especially as the number of message delivery means keeps increasing over time. The automated selection of the delivery method of various types of communications can then be integrated with the system and method for automating the implementation and use of presence information to select the most efficient delivery method based in part on the current presence status of another user.

SUMMARY OF THE INVENTION

An embodiment of the present invention enhances the overall efficiency and functionality of the user experience with communication systems by introducing additional presence attributes, and common composer and message threading features to communications systems. An embodiment of the present invention provides capability for a user to interact with cellular communications systems through other methods of communication, such as a computer or other device, while still using much of the same functionality, including presence attributes, and common composer and message threading features.

An embodiment of the present invention provides a system and method for dynamic updating of presence information in a communications system. Presence information is communicated by a first device to a server, e.g., a presence server and/or a server associated with a network address book of the entity associated with the first device. The presence server or other server receives the presence information and determines whether there are any subscribers of the presence information of the entity. The subscribers are informed about the received presence information and/or presence information is obtained about the subscribers by the presence server. In determining the subscribers, information from a network address book associated with the presence information sent by the first device is reviewed. In a further embodiment, the presence information is synchronized by the first device with the network address book before communicating the presence information to the presence server. In an embodiment, the network address book is stored on a network address book server.

In an embodiment, the synchronization occurs via synCML DS. In an embodiment, the presence information is transmitted via SIP. In an embodiment, the presence server accesses information in the network address book using XCAP through XDMS. In an embodiment, the first device registers to IMS before communicating the presence information to the presence server. In an embodiment, the presence information provided by the first device is updated on at least one of: an immediate basis, periodic interval, intermittent interval, and manual request. In an embodiment, the presence information of the at least one subscriber is updated on at least one of: an immediate basis, periodic interval, intermittent interval, and manual request. In an embodiment, a database of the first device is updated on any changes to the presence information of the at least one subscriber on at least one of: an immediate basis, periodic interval, intermittent interval, and manual request. In an embodiment, the first device is a mobile telephone. In an embodiment, the updated presence information is viewable via a second device associated with the same user as the first device. In an embodiment, the updated presence information is viewable via the Internet. In an embodiment, only the presence information of one entity is transmitted to the network address book and the presence server.

An embodiment of the present invention provides a system and method for dynamic communication of presence information in a communications system, including: a communications device, the communications device configured to transmit presence information of an entity to a presence server; a second server, the second server configured to extract information from a network address book and to transmit certain information based on the extracted information upon request by the presence server, wherein the communications device communicates via a synchronization protocol with the presence server. In an embodiment, the presence server provides updated presence information to any authorized entities, the extracted information indicating which entities are authorized. In an embodiment, the updated presence information is viewable via a second device having a same authorization to view presence information as the first device. In an embodiment, the presence information provided by the first device is updated on at least one of: an immediate basis, periodic interval, intermittent interval, and manual request. In an embodiment, the presence information of the at least one subscriber is updated on at least one of: an immediate basis, periodic interval, intermittent interval, and manual request. In an embodiment, a database of the first device is updated on any changes to the presence information of the at least one subscriber on at least one of: an immediate basis, periodic interval, intermittent interval, and manual request.

BRIEF DESCRIPTION OF THE DRAWINGS

FIG. 2 shows an example network address book table according to an embodiment of the present invention.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Standards such as 3GPP and OMA, define "presence" as a service enabler that support services based on functionality including collecting and disseminating different types of presence information to different types of entities. Different types of presence information can be anything from user's availability, user updated icon or text, type of handset capabilities, etc. Different types of entities could be users that provide presence related information about themselves (similar to "buddies" used in common IM service provide), or could be a value added service such as a weather service entity that disseminates weather information.

Figure 1:
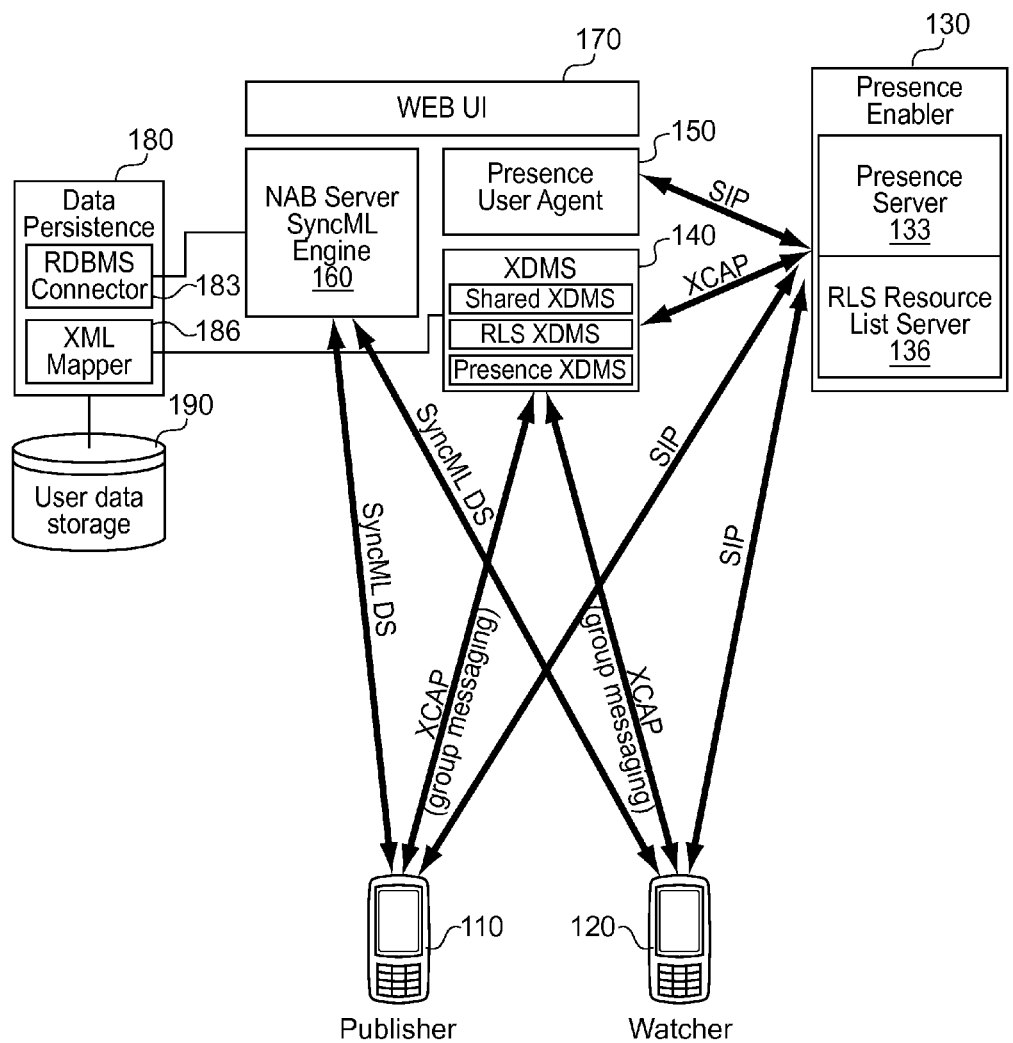
FIG. 1 shows an example system according to an embodiment of the present invention.

FIG. 1 shows an embodiment for an enhanced messaging system automating the implementation and use of presence information in cellular communications systems. An Enhanced Messaging system is a system for transmitting information in communication systems which automates the information sharing process to facilitate the user's ability to quickly share information. Presence Information includes any information in any form, audible, visual, or otherwise, capable of informing a second entity about the first entity or the device being used by the first entity. A Presence Server is a system capable of accessing, updating, storing, and publishing Presence Information.

In an embodiment described in FIG. 1, the Publisher 110 and the Watcher 120 are both devices operated by users of the communication systems. Although the devices pictured in FIG. 1 representing the Publisher 110 and the Watcher 120 are both cell phones, these pictures are for illustrative purposes only. These devices may be replaced by any device capable of processing and transmitting information. In an embodiment, the communications systems may be configured in such a way that it is possible for the system to discern at some level when users of devices, such as the Publisher 110 and the Watcher 120, are available and hence "present" in order for the automated aspect of the presence system to function. For example, in an embodiment, hardware or software is used either on the user's device or incorporated as part of the communications systems that can identify whether a particular user's device is "on" or "off" or whether the user's device is connected to the communications system or whether the user's device is or has recently sent or received any information. In an embodiment, the presence mechanism itself can effect the same function. For example, the presence mechanism informs a first device that a second device is available, and then passes to the second device the presence attributes values. In FIG. 1, for example, the publisher is using a sync session to NAB in order to pass all the presence information changes. Then, in this embodiment, NAB "publishes" or transmits the information on behalf of the user to the presence server. For example, the presence server's duty is to notify all the watchers about changes in the publisher presence information. The presence server's duty to do such may be that which is mandated by a known standard. In an embodiment of the present invention, the NAB publishes information on behalf of a user, and syncML is used to sync the information to NAB to facilitate the event. The NAB includes publisher contact(s) details. In an embodiment, a user may publish via a mobile phone or other transmitting device such as a PC client. In an embodiment, a user may publish via the Internet or other network.

In an embodiment of the present invention, the attributes of an account are "in sync" regardless of which device is used to publish and later display the attributes. For example, information is transmitted or published by a mobile phone or other device, and later can be viewed via the Internet using a computer or other device. This is a vast improvement over existing systems which do not allow for such syncing, among other features of the present invention.

A Network Address Book ("NAB") Server is a system capable of accessing, modifying, and storing an Address Book primarily residing remotely in a user's device (e.g. mobile phone). A Network Address Book is a list of information obtained from or about a user or a user's activities relating to the identification of other entities or devices potentially used by the entities with whom the user may communicate that is not entered by the user solely for the purpose of obtaining presence information. The NAB Server 160 embodied in FIG. 1, for example, when viewed in conjunction with Data Persistence 180 and User Data Storage 190, would correspond to a computer system capable of accessing, modifying and storing what is commonly referred to as a user's electronic address book. Although the embodiment in FIG. 1 shows an NAB Server 160 connected to Data Persistence 180 and User Data Storage 190, such specific interconnectivity is not required. In an embodiment, a Network Address Book is stored independently of any particular device such that the information in the Network Address Book can be accessed at any time through various means. In the context of a cellular phone user, an example of an Network Address Book could be the cellular phone user's address book, which typically contains a list of names and contact information, such as cellular phone numbers, for those with whom the user communicates, an example of which is shown in FIG. 2. Although an electronic address book is one example of an Network Address Book, other lists, such as a list of incoming and outgoing telephone numbers on a cellular phone can also constitute a Network Address Book. In the embodiment described in FIG. 1, for example, the cellular telephone numbers of individuals listed in the General Phonebook Section 210 of a cell phone user's address book would provide sufficient information to identify the cellular phone devices used by each of those individuals. Thus, if the Publisher 110 has the Watcher's 120 cellular phone number stored in the Publisher's 110 General Phonebook Section 210, and the Watcher 120 also has the Publisher's 110 cellular phone number similarly stored, then this information can be extracted from the Publisher's 110 Network Address Book to identify the Watcher's 120 device and vice versa. In an embodiment, the Publisher and the Watcher can be the same entity via one or more devices.

The synchronization session between the NAB Server 160 and the user's device, such as the Publisher 110 or the Watcher 120, which can occur through a Synchronization Markup Language Data Synchronization (SyncML DS) session, ensures that any particular device being used is able to access the most recent information contained in a user's Network Address Book. Use of the SyncML DS session is more efficient than XML Configuration Access Protocol (XCAP) and also obviates the need for XCAP capabilities in phones implementing presence. Although dynamic synchronization is not required for the present invention, it is an embodiment of the present invention which minimizes the risk of confusing the user with inconsistent and possible conflicting address book information if, for example, a user obtains a replacement device with an empty local address book. In an embodiment, the user's device will then register to the Internet Protocol Multimedia Subsystem (IMS) and start the presence client through a Presence Server 133 to begin sending and receiving Presence Information. IMS uses IP Multimedia Services Identity Module (ISIM), which runs on a smart card and includes parameters for identifying and authenticating a user to IMS Similarly, the device can be programmed to notify the Presence Server 133 of certain conditions that may impair the sending or receiving of communications, such as when the user turns off or suspends the device, the device's battery is running low, and cellular phone signal strength is minimal, so that the Presence Server 133 can update others of the user's change in presence status, such as "offline" or "unavailable." It is also possible for the device to register or de-register with IMS or other subsystems performing a similar function at any time, irrespective of when or if synchronization with the NAB Server 160 occurs.

In an embodiment, syncML is used to sync up a specific contact which includes the publisher's presence values. For example, the specific contact is labeled "myself" and contains the specific presence values of the user who is publishing the information. In this embodiment, one efficiently transmits the user's or publisher's presence information from the mobile phone or other device to NAB instead of doing a sync via syncML or other mode for all contacts and XCAP (XML Configuration Access Protocol) for the user's presence.

In the embodiment shown in FIG. 1, communications between the user's device, such as the Publisher 110 or the Watcher 120, and the Presence Server 133, occur through the Session Initiation Protocol (SIP) following SIP SIMPLE 1.0, though the invention can be used with any other protocol capable of the same functionality. When a user's device first registers with the Presence Server 133 after being turned on, the Presence Server 133 automatically begins accessing the information contained in the user's Network Address Book and also begins publishing this particular user as being "online" or "available," absent any specific instructions from the user to the contrary. In an embodiment, the Presence Server 133 can access and retrieve information from the user's network address book through an XDMS 140 (XML Data Management Server) via XCAP. The XDMS 140 accesses the user's network address book stored in User Data Storage 190 through an XML Mapper 186.

Once the Presence Server 133 is able to access information contained in the user's Network Address Book, an example of which is shown in FIG. 2, the Presence Server 133 uses that information to ascertain presence information about the individuals listed in the user's Network Address Book. For example, in a cellular communications system, the Presence Server 133 can check for presence information on other individuals listed in a Network Address Book based on the cellular telephone numbers for each of those individuals listed in the General Phonebook Section 210. Once the Presence Server 133 has determined what type of presence information is available for each of the individuals listed in a user's Network Address Book, the Presence Server 133 is able to send notifications to the user's device of the current status of each of the individuals listed in the user's Network Address Book. For example, the user could be notified through the Presence Server 133 of whether each of the individuals listed in the Network Address Book is "available", "unavailable", or the individuals status is "unknown" because no presence information is available for that specific individual. As the Presence Server 133 is updated with new presence information, the Presence Server 133 is able to send updates to the user's device so that the user has automatically updated presence information, though it is also possible to configure the system to disable automatic updates to the user and only have presence information updated at the specific request of the user, or updates at specific times and/or intervals, or another.

To minimize unnecessary communication with the Presence Server 133, it is also possible to program the NAB Server 160 to pre-screen a user's Network Address Book and only transmit a list of entities to the Presence Server 133 for which presence information is actually ascertainable and/or determined desirable. For example, a Network Address Book could keep track of the types of devices used by or registered to each user so that only those devices capable of transmitting Presence Information to the Presence Server 133 are communicated with at later dates.

As an additional means of ensuring widespread access, availability, and ease of use of the invention, an embodiment can also include interconnectivity with other non-cellular systems connected to cellular communications systems. The embodiment in FIG. 1, for example, allows users to access, change, and view presence information through a User Interface 170 indirectly connected to the communications system, such as through the Internet. However, a user is not necessarily required to access the User Interface 170 through the Internet; access to the User Interface 170 can also occur through other means as long as there is adequate connectivity between the user and the User Interface 170. In an embodiment, a user connects to the User Interface 170 through an Internet website as opposed to a proprietary communications system or network because of the relative ease of access and low cost associated with Internet access.

When the user initially connects to the user's account through the User Interface 170, the connection can be registered to the Internet Protocol Multimedia Subsystem (IMS), though such registration is not required, and the Presence User Agent 150 is initiated. The Presence User Agent 150 is the primary interface between the User Interface and the presence system 170. The Presence User Agent 150 then informs the Presence Server 133 of the user's status as "online" or "available" absent any instructions from the user to the contrary, such as if the user wanted their status to be displayed as "offline" or "unavailable" because they did not want others to know that they were "available."

The User Interface 170 can provide the user with the option of directly accessing, viewing, and changing certain information contained in the user's Network Address Book, such as certain information in the General Phonebook Section 210, myFaves® Section 230, or certain information about the user's presence in the Presence Section 270, through the NAB Server 160. Although the embodiment shown in FIG. 1 indicates that the information from the user's Network Address Book is obtained from User Data Storage 190 through a Relational Database Management System Connector, RDBMS Connector 183, to the NAB Server 160, such connectivity is not required as any method of communication that is able to permit the user to access, change, and store information contained in the user's Network Address Book through a User Interface 170 will suffice. In one embodiment, the Presence User Agent 150 is also able to access the information in the user's Network Address Book via the NAB Server 160, as the information is being transmitted to, viewed, or changed by the user through the User Interface 170. The Presence User Agent 150 then sends pertinent information to the Presence Server 133, such that the Presence Server 133 can ascertain presence information about the individuals listed in the user's Network Address Book. For example, in a cellular communications system, the Presence Server 133 is informed of presence information on other individuals listed in a Network Address Book based on the cellular telephone numbers for each of those individuals. For example, a user publishes presence information to the Presence Server 133. Then, the Presence Server 133 checks its information to determine who has a subscription to the publisher's presence attributes. Once the Presence Server 133 determines who has a subscription to the publisher's presence attributes, the Presence Server 133 then notifies those individuals of the changes. In an embodiment, the Presence Server 133 determines what type of presence information, e.g., subscriber of a certain type of certain users, is available for each of the individuals listed in a user's Network Address Book, and then sends notifications of the current status of each of the individuals listed in the user's Network Address Book to the Presence User Agent 150, which in turn relays this information to the user via the User Interface 170.

In an embodiment, once the user connects to their account through the User Interface 170, presence information relating to individuals in a user's Network Address Book is obtained through a XML Data Management Server, XDMS 140, collocated with NAB Server 160, which can access pertinent information in the user's network address book stored in User Data Storage 190 through a XML Mapper 186. XDMS 140 then transmits this information via XML Configuration Access Protocol (XCAP) to the Presence Server 133, which checks the current presence information for each of the relevant entries in the user's Network Address Book. The Presence Server 133 then sends current presence information to the Presence User Agent 150, which then presents the information to the user via the User Interface 170. As the Presence Server 133 is updated with new presence information, the Presence Server 133 transmits that updated information to the Presence User Agent 150, which in turn updates the user through the User Interface 170. Collocating XDMS 140 with NAB Server 160 increases reliability by using a unified database for all the data contained in a user's Network Address Book, as shown in FIG. 1.

These embodiments illustrate a few of the exemplary methods by which presence information can be automatically and/or dynamically made available to users without requiring the entry of additional information; any means of interactive communication in which presence information is automatically obtained for individuals listed in a user's Network Address Book should suffice. Furthermore, although the automatic updating of presence information after the user obtains the initial set of presence information for the individuals listed in the user's Network Address Book is a desirable feature, such a feature is also not required. In fact, it is possible to configure the system to disable or limit to specific intervals, or at the specific request of a user, any automatic updates to the user after the initial update; it is also possible, of course to limit or disable even the initial updating of presence information.

Aside from merely indicating the availability of a user, different embodiments of the invention may allow for different types of customization and personalization of the presence system. In different embodiments, users can be permitted assign or associate various pictures, icons, taglines, notes, comments, sounds, or videos with their presence information, which can change depending on the presence status of the user. For example, a user could associate a picture of themselves or a tagline with their presence information such that the user's picture or tagline will appear in the presence or other section of another user's network address book who has the first user listed as contact.

The Presence Section 270 (e.g., see FIG. 2) is an example of how a customizable tagline and icon could appear in another users Network Address Book. In an embodiment, each user is able to access and change their own presence information, such as their tagline, presence photo, and privacy settings in the Presence Section 270 of the row marked MyProfile. Storing the privacy settings in a simple field the user's Network Address Book minimizes the need to use XCAP to send XML rules documents to XDMS 140. In an embodiment, users may be allowed to change or override another user's customization or personalization as it appears to that particular user. For example, if a user selected a customized penguin icon as their Presence icon shown in the Presence Section 270, then a second user would ordinarily see the penguin icon in the Presence Section 270 of their Network Address Book entry for the first user, unless the second user opted to replace the penguin icon selected by the first user with another icon. In this case the other "replacement" icon would only appear in the second user's Network Address Book; other users would see the penguin icon selected by the first user. To avoid confusion of which icon is to be displayed in the Presence Section 270, a Toggle Field can be added to the Presence Section 270. The Toggle Field can keep track of whether the user has changed some of the customizations made by the other users listed in their Network Address Book so that the correct customization can be displayed. Additionally, further customizations could be added depending on the current status of a user. For example, a user could opt to have a different picture, icon, tagline, note, comment, sound, video, or other form of multimedia for each status setting. For example, if the user's device is turned off, a picture of a personal sleeping is shown with a tagline. Or, for example, if the user is on another call, a phone-type icon appears. Or, for example, if the user is away and traveling, an airplane engine could play.

To minimize confusion and ensure a consistent experience, in an embodiment of the present invention, users are able to access all of the same features through a similar presentation irrespective of the method of access. Thus, for example, if it is decided that users connected through the User Interface 170 are authorized to access and view others' presence information through the method shown in FIG. 2, then this method also may be used by those using devices, such as the Publisher 110 or the Watcher 120, to access and view others' presence information. In an embodiment, a user may make the same customizations and personalization through the User Interface 170 that the user is able to make through the device in the same manner as which it is done through the device. In an embodiment, one can limit the availability of certain features to a particular access method, such as through a device or the User Interface 170.

Different embodiments can also be implemented to ensure that the presence information being broadcasted about a user is accurate and current. In some embodiments, the Presence User Agent 150 or devices, such as the Publisher 110 and Watcher 120, are programmed to periodically notify the Presence Server 133 that the user or device is still online and/or capable of sending and/or receiving communications. If the Presence Server 133 does not receive such a timely update, the Presence Server 133 will presume that the user or device is unable to send or receive communications and will automatically modify the status of the user accordingly. In other embodiments the communications system, through the Presence Server 133 or another means, sends queries to the User Interface 170 via the Presence User Agent 150, to the Presence User Agent 150, or to a device to verify whether the user or device is still capable of readily sending or receiving communications. In yet other embodiments the Presence Server 133, Presence User Agent 150, User Interface 170, or other system monitors communications sent or received by a user or device to verify whether the user or device is still readily able to send or receive communications, updating the user's status accordingly. Considering the cost of implementing each method and managing the additional traffic generated in providing frequent updates of current presence status, if the periodic update method is used to verify presence information, then the periodic updates can be limited to periodic intervals, e.g., five minute intervals. In order to minimize unnecessary communication, short codes can also be sent if there are no changes in presence information since the last update. Similarly, if the presence information has changed, another a short code incorporating the changes can also be sent. In addition to short codes, links to updated media or information can also be transmitted. The user then has the option to use the link to retrieve the actual updated information or media.

Different embodiments can also be implemented to offer privacy protection to users who do not want their presence information to be widely broadcasted. User can have the option, for example, of opting out of the presence information system altogether by not disclosing any type of presence information. In other embodiments, users can be presented with the option of either disclosing or not disclosing presence information to some or all of the individuals listed in their Network Address Books, or of only disclosing limited presence information, such as a tagline or photo but not the current presence status. To minimize confusion while ensuring ease of use and privacy, it is recommended that all entities listed in a user's Network Address Book be permitted to access presence information of that user by default, unless the user specifically indicates otherwise. In an embodiment, other individuals who are not listed in a user's Network Address Book are prohibited from accessing presence information of that user unless they subsequently are given permission by the user, such as by being added to the user's Network Address Book. In the embodiment in FIG. 1, for example, if the Publisher 110 and Watcher 120 are both listed in each others Network Address Book, then absent any changes by these users, they would be able to see each others presence information by default without any specific intervention by each user.

In an embodiment, one may incorporate systems which can automatically update the availability of Presence Information about another user if that user switches devices, cancels service, or otherwise changes the accuracy of the availability of presence information. For example, if a user upgrades to a device capable of interacting with the presence system and the new device information is registered with the communications system, the NAB Server 160 can be programmed to automatically update the new availability of Presence Information about this user in the Network Address Books of other users. Similarly, if a user decides to cancel service, the NAB Server 160 can be programmed to automatically remove any presence information on this user in the Network Address Books of other users or a specific user.

Once the Presence Server 133 is provided with information included in the user's Network Address Book, an example of which is shown in FIG. 2, the Presence Server 133 uses that information to ascertain presence information about the individuals listed in the user's Network Address Book. For example, in a cellular communications system, the Presence Server 133 checks for presence information on other individuals listed in a Network Address Book based on the cellular telephone numbers for each of those individuals.

Once the Presence Server 133 has determined what type of presence information is available for each of the individuals listed in a user's Network Address Book, the Presence Server 133 is able to send notifications to the user's device of the current status of each of the individuals listed in the user's Network Address Book. For example, the user could be notified through the Presence Server 133 of whether each of the individuals listed in the Network Address Book is "available", "unavailable", or whether the individual's status is "unknown" because no presence information is available for that specific individual.

In an embodiment, the Presence Server 133 accesses and retrieves information from the user's network address book is through a XDSM 140 (XML Data Management Server) via XML Configuration Access Protocol (XCAP). The XDMS 140 can access the user's network address book stored in User Data Storage 190 through a XML Mapper 186.

In an embodiment, in order to measure the resource use and efficiency of the presence system, the usage and additional network traffic generated in implementing and modifying the presence system are measured. Measuring quantities such as the amount of network traffic generated over different networks in transmitting each attribute, update, and event at the system level can provide insight into optimal resource allocation. Measuring the number and volume of communications per communication type, per user, per network, or per access method, such as through a device or User Interface 170, and the number of individuals that each user receives presence information for would provide useful information in this regard.

In an embodiment, to diagnose potential problems with the presence system, it is useful to have the capability of allowing support personnel access to certain portions the system through existing processes such as single sign on, authentication, and user groups. For example, allowing support personnel access to determine whether a user's device automatically registered with IMS after being turned on, when the user's device last communicated with the Presence Server 133, or if there is any updated presence information pending for a user, are all examples of useful information accessible to support personnel. Information that does not assist support personnel in diagnosing problems with the presence system, such as viewing the contents of any attributes or communication between users may be blocked or restricted.

Automated Message Delivery Protocol Selection

In an embodiment, the selection of different protocols by which a text, video, picture, or multimedia message is to be sent can be automated so that the user does not have to pre-select a specific protocol in advance. Both a Universal Message Composer interface and message threading can be used to streamline the message sending process from the initial creation of the message to the final transmission of the message. A Universal Message Composer allows a user to use a single interface for sending different types of messages containing different types of content. The Universal Message Composer can also be adapted for use in both immediate and session based messaging.

In immediate messaging, the message sender accepts a message to be delivered immediately, in what is perceived to be real time. In session based messaging, a communication association is established between two or more users before actual communication takes place. Session based messaging may be considered a direct communication between two users, e.g., a "chat" feature.

In an embodiment, the Universal Message Composer can be adapted to process a message containing one or more different types of recognized media, such as text, pictures, sounds, videos or other media. It is possible, depending on how the interface is configured in different embodiments, to send a message containing varying media types, such as some text, followed by a picture, then more text, followed by a video. The interface can also be configured to change depending on the media type selected by the user. For example, if the user inserts or selects text, the interface could provide the user with the option of changing various aspects of the text, such as the font, size, and appearance; if the user inserts or selects a picture, the interface could change to provide the user with other picture editing options such as resizing, enhancing, and cropping. Although a Universal Message Composer is desirable, in that it eliminates the need for multiple, independent interfaces, it is not required for the remainder of the invention to work.

Figure 3:
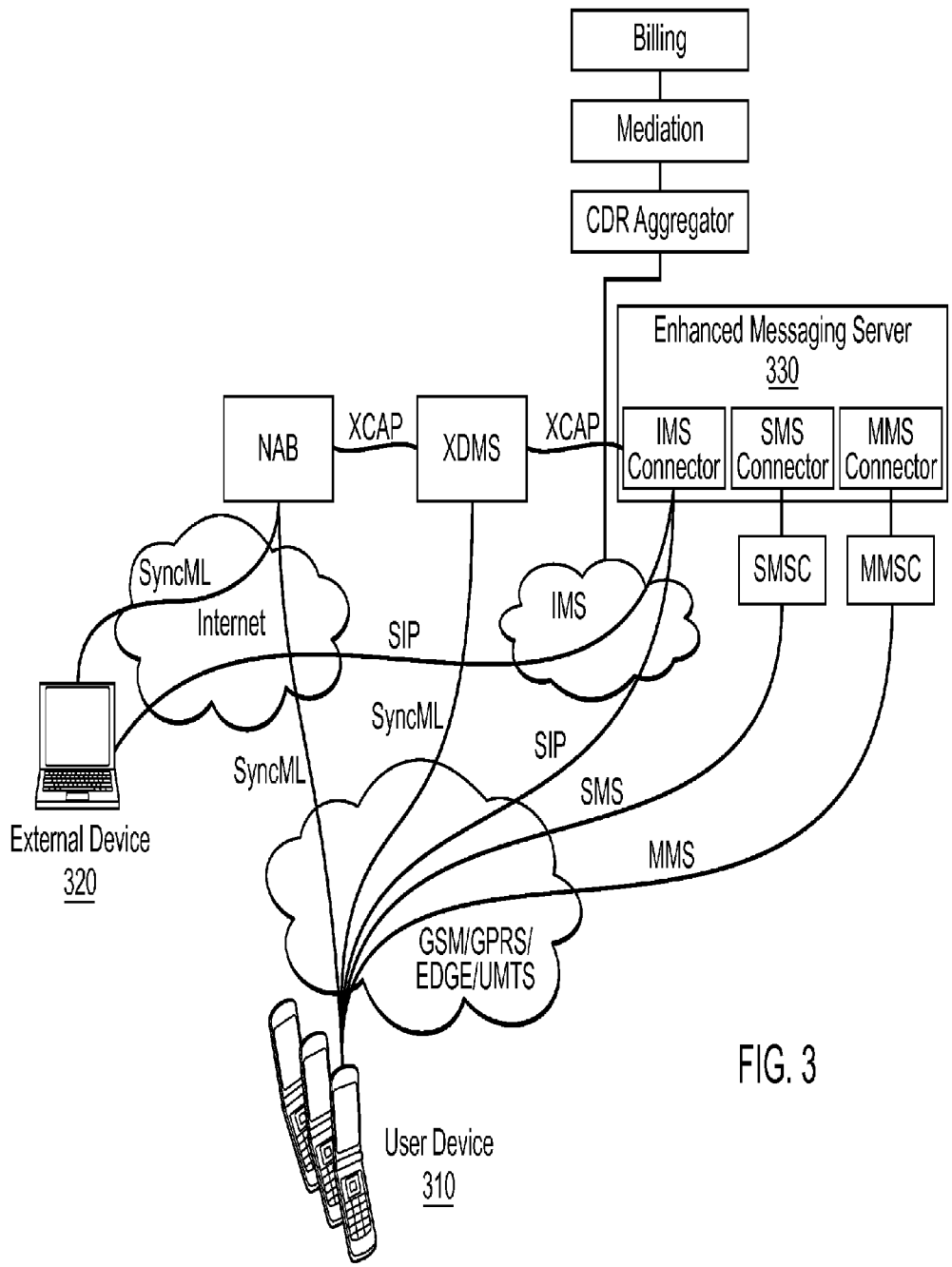
FIG. 3 shows an example message delivery according to an embodiment of the present invention.

FIG. 3 illustrates the different communications methods used by the Enhanced Messaging System once the user has finished composing a message and the message is ready to be sent. The logic used by the User Device for selecting the most efficient message delivery means. Once the message is ready to be sent, the User Device 310 first verifies that it is registered to IMS. If the User Device 310 is registered to IMS, then the message is sent to an Enhanced Messaging Server 330 using SIP, irrespective of the message contents. An Enhanced Messaging Server is a system capable of at least sending and receiving messages through SIP, MMS, and SMS. If used for session based messaging, then the Enhanced Messaging Server is also capable of sending and receiving session based messages. If the User Device 310 is not registered or can not register to IMS and the message contains only text, then the message will be sent by the device to the Enhanced Messaging Server 330 as a SMS, otherwise the message will be sent by the User Device 310 to the Enhanced Messaging Server 330 as a MMS.

Figure 4:
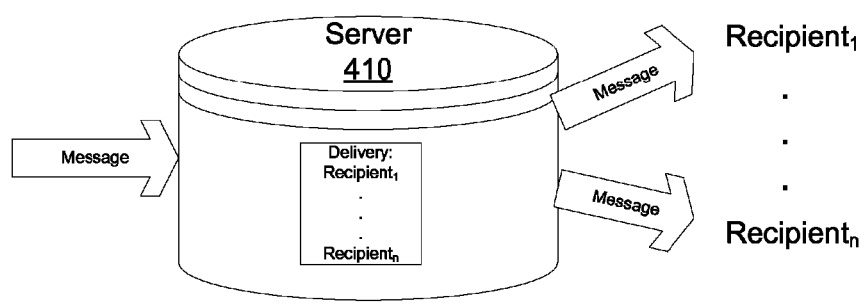
FIG. 4 shows an example messaging system according to an embodiment of the present invention.

The logic used by the Enhanced Messaging Server 330 for selecting the most efficient message delivery means includes at least one of the following elements: Once the Enhanced Messaging Server 330 receives a message, it checks the message to see if the message is being sent to at least one recipient registered to IMS. One way of verifying if a recipient is registered to IMS is by checking to see if the recipients phone number is registered to IMS. If that particular recipient or recipient's phone number is registered to IMS, the Enhanced Messaging Server 330 sends the message to the recipient using SIP, irrespective of the message contents. If that particular recipient is not registered to IMS and the message contains only text, then the message will be sent by the Enhanced Messaging Server 330 to the recipient as a SMS, otherwise the message will be sent by the Enhanced Messaging Server 330 to the recipient as a MMS. To facilitate communications being sent to multiple users so that a message sender does not have to repeatedly enter the same information, the Enhanced Messaging system could support group creation and management such that messages could be sent to a message delivery list and then distributed to multiple users through a Messaging Server 410 as shown in FIG. 4. The Messaging Server 410 can be included as part of the Enhanced Messaging Server 330 or it can be a separate entity which receives and processes messages sent to a message delivery list following the message distribution rules discussed herein. As shown in FIG. 4, the List Creator 440 uses IMS group management to create a message delivery list registered with the Messaging Server 410. Depending on the properties selected by the List Creator 440, whenever certain messages, such as messages from certain known recipients, are sent to the message delivery list, the Messaging Server 410 will automatically forward those messages to specified users in accordance with the properties selected by the List Creator 440.

Aside from a User Device 310, both session based and immediate messages can also be sent and received through alternate means, such as the User Interface 170, accessed through an External Device 320 depicted in FIG. 3. Although the External Device 320 depiction is intended to show access to the User Interface 170 through a computer indirectly connected to the communications system through the Internet, access to the User Interface 170 can also occur through other means as long as there is adequate connectivity between the user and the User Interface 170. Once a user is connected to the communications system through the User Interface 170 on the External Device 320, the user becomes registered to IMS and is able to send and receive messages containing different types of media to and from the Enhanced Messaging Server 330 using SIP, with the option of having alternate delivery methods, such as SMS or MMS, as a backup if communication through SIP fails. The user can connect to the communications system and become registered to IMS either as an independent entity or as an entity associated with the specific device or devices registered to the user. The User Interface 170 should also allow a user to engage in session based messaging, commonly referred to as a chat session, with other users. If other participants in chat session are also registered to IMS, then the session based messaging should occur through SIP. The User Interface 170 should allow the user to engage in ad hoc or predefined group chat sessions such if the user is unable to successfully initiate a chat session with either certain or all members of the group, the system will revert to sending an immediate message to those members.

Depending on the configuration of the system, the Enhanced Messaging Server 330 can be equipped with capability of detecting whether message recipients are registered to IMS even if they are associated with another communications system or carrier. Additionally, the External Device 320, User Interface 170, User Device 310, and Enhanced Messaging Server 330 can be equipped with capability of detecting whether a message delivery attempt via SIP was successful. If the message was unable to be delivered by SIP, the Enhanced Messaging Server 330 and each of these other devices and interfaces can be configured to resend the message through another delivery method, such as SMS or MMS, depending on the answer received from the IMS infrastructure.

While MMS provides an adaptable framework for sending and receiving various types of media, SIP does not provide such a framework. Different embodiments can be used in conjunction with SIP to compensate, if necessary, for this limitation of SIP to ensure proper compatibility and functionality. For example, rules can implemented restricting the types of media that can be sent in messages through a User Device 310, User Interface 170, External Device 320, and Enhanced Messaging Server 330. In another embodiment these rules can be adjustable depending on the media capabilities of the message recipient. As another option, a User Device 310 can also be limited to displaying or playing only certain types of media. Rules can also be implemented setting forth the specific media types permitted in messages that the Enhance Messaging system should be capable of handling, such as 3GPP 26.140 and 3GPP 26.141. A media transcoding engine can also be used to assist in media adaptation.

Different methods can also be used to ensure that the Enhanced Messaging system runs efficiently and avoids unnecessary or unproductive communications. For example, the Enhanced Messaging system could be configured to only send a link, placeholder, or URI of part or all of the message content to the recipient, such that if the recipient really wanted to view the contents, the recipient could download the multimedia content from storage. This would be especially useful when sending large multimedia files which can be resource intensive. The Enhanced Messaging system can also implement store and forward functionality, where messages are stored in a specific format such as MIME Multipart. A specific format, such as MIME/CPIM can also be specified for session based messages. The system can also be provided with the option to filter or block messages based on Specified Preferences, including but not limited to, sender addresses, message content type (e.g. video, audio), message type, message content, and message subject, which can configured by a user or system administrator.

To provide the user with additional communications options, a preferred embodiment would support multiple communications methods, including both immediate messaging and session based messaging. In session based messaging, a user, using a device capable of two way communications, such as a cellular phone or a computer, sends a session invitation to another user. If the second user accepts the invitation, two-way messaging takes place after bearer and capabilities negotiations, similar to PC based instant messaging. To facilitate customer adoption by making session based messaging easy to learn and use, it is preferred that the Enhanced Messaging Server 330 support the sending of invitations to chat sessions so that the user receiving a new invitation to chat will receive the message in a manner similar to that of a new mail message notification. If the chat invitation could not be sent or a timely response was not received by the initiator, then the initiator's device should revert to sending an immediate-type message to the invitee(s). Similarly, user devices should also be equipped with sufficient internal storage to store a copy of the information exchanged during session based messaging, not only for subsequent review by a user, but also to ensure that any session based message that was unable to be sent because another part went offline could be subsequently sent via immediate messaging so the communication can be completed.

To facilitate interoperability and compatibility with other communication systems, all devices and systems supporting session based messaging should follow OMA Instant Messaging using SIMPLE v1.0 and may also follow 3GPP requirements as applicable, for example the 3GPP 2x.340 specification series for IMS messaging. Another method of facilitating widespread interoperability and compatibility is by ensuring that devices participating in session based messaging are programmed to assess the capabilities of other devices participating in the messaging session, including factors such as display capabilities, supported media types (audio, video), supported media formats (JPEG, MP3), storage capacity, and supported encryption/security mechanisms are all examples of potential differences between devices that can impact the successful exchange of communication in session based messaging. Having a user send a picture or video to another user through session based messaging in an unsupported format is not only an inefficient use of time and resources, but will also lead to user frustration and less customer adoption. By assessing the capability of each device participating in the chat session and notifying users of the lowest common supported feature set among the devices, users can make an informed decision before the chat session begins of how the session is to be conducted.

Figure 5:
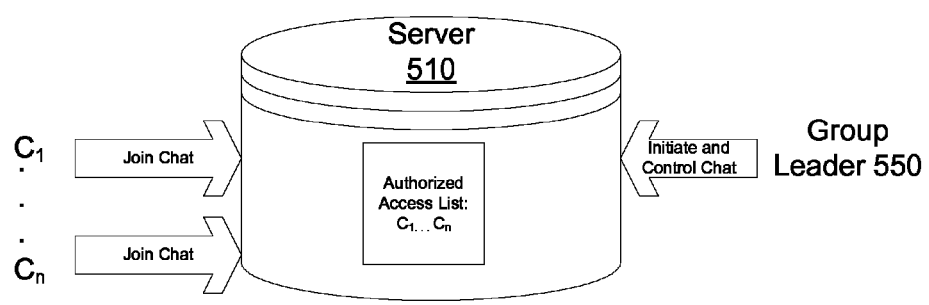
FIG. 5 shows an example session based messaging system according to an embodiment of the present invention.

Group Creation and Management can also be used to facilitate session based messaging between multiple users, so that multiple users can repeatedly join and leave an ongoing chat session without necessarily receiving a specific invitation. FIG. 5 shows how Group Management can be used in session based messaging—the Group Leader 550 can register a session based messaging or chat session with the Chat Server 510 through IMS Group Management or a similar framework for managing groups. Once the Group Leader 550 registers a particular group with the chat session, the Group Leader 550 can create a list of the users or groups of users who are either excluded from or permitted to join the chat. User can then join the particular group registered by the Group Leader 550. The Chat Server 510 can also be programmed to notify the users identified by the Group Leader 550 of the chat session at specified intervals or under specified conditions. Group Creation and Management in both the immediate and session based messaging contexts should be handled by the same XDMS handling presence.

To facilitate the accounting and auditing of the enhanced messaging system's use, the system should be capable of collecting and correlating data from the IMS elements and the Enhanced Messaging system to specific users. This data should include whether any users with portable devices, such as cellular phones, were roaming while they were using the Enhanced Messaging system as well as the extent, duration, and functionality of the Enhanced Messaging system used by the user. For example, information such as the size and type of any media sent or received in either immediate or session based messaging shows both the extent and functionality of the messaging system used, just as information identifying the number of messages sent or received by a user and the number of distinct users to whom a particular message was sent reflect on the extent to which the system is used.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine read able (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. The present invention includes variations from the specific examples and embodiments described herein. Except to the extent necessary or inherent in the processes themselves, no particular order to steps or stages of methods or processes described in this disclosure, including the figures is implied. In many cases, the order of process steps may be varied without changing the purpose, effect or import of the methods described.

What is claimed is:

1. A method for dynamic updating of presence information in a communications system, comprising:
    registering a mobile device with a presence server following the mobile device being turned on;
    sending presence information from the mobile device to the presence server for distribution to one or more mobile devices of at least one subscriber that is listed in a network address book for the mobile device, the network address book being stored on a network address book server; and
    automatically receiving, at the mobile device, updated presence information of the at least one subscriber listed in the network address book from the presence server, the mobile device receiving the updated presence information without receiving additional user inputted information in response to the mobile device having a subscription to the presence information of the at least one subscriber, the updated presence information being obtained by the presence server from the one or more mobile devices of the at least one subscriber following the network address book server determining that the one or more mobile devices are capable of transmitting the updated presence information to the presence server.

2. The method of claim 1, further comprising synchronizing the presence information of the mobile device with the network address book before communicating the presence information to the presence server.

3. The method of claim 2, wherein the synchronization occurs via SyncML Data Synchronization (SyncML DS).

4. The method of claim 1, wherein the presence information is transmitted via Session Initiation Protocol (SIP).

5. The method of claim 2, wherein the presence server accesses information in the network address book using XML Configuration Access Protocol (XCAP) through XML Data Management Server (XDMS).

6. The method of claim 1, wherein the mobile device is registered to Internet Protocol Multimedia Subsystem (IMS) before communicating the presence information to the presence server.

7. The method of claim 1, wherein the presence information is updated on the mobile device upon at least one of: an immediate basis, periodic interval, intermittent interval, and a manual request.

8. The method of claim 1, wherein the at least one subscriber is determined to receive the presence information and the updated presence information of the at least one subscriber is updated upon at least one of: an immediate basis, periodic interval, intermittent interval, and a manual request.

9. The method of claim 8, wherein a database of the mobile device is updated with the presence information of the at least one subscriber upon at least one of: an immediate basis, periodic interval, intermittent interval, and a manual request.

10. The method of claim 1, wherein the updated presence information is viewable via a second device associated with the same user as the mobile device.

11. The method of claim 1, wherein the presence information includes an availability status of a user that uses the mobile device to communicate with the at least one subscriber.

12. The method of claim 1, further comprising receiving, at the mobile device, a user request to at least one of access, change, and view the presence information through a user interface that is accessible to the mobile device through an Internet website or a proprietary network.

13. A system for dynamic communication of updating presence information in a communications system, comprising:
  a presence server that registers mobile devices in response to the mobile devices being turned on for providing presence information to the mobile devices; and
  a mobile device that automatically receives updated presence information of at least one subscriber listed in a network address book for the mobile device from the presence server, the updated presence information being obtained from one or more mobile devices of the at least one subscriber following a network address book server that stores the network address book determines that the one or more mobile devices are capable of transmitting the updated presence information to the presence server,
  wherein the mobile device provides at least one of access, change, and view to the presence information through a user interface at least indirectly connected to the communications system.

14. The system of claim 13, wherein the mobile device further sends presence information from the mobile device to the presence server for distribution to one or more mobile devices of the at least one subscriber that is listed in the network address book, the presence information indicating that a user of the mobile device is available to communicate with the at least one subscriber via the mobile device.

15. The system of claim 13, wherein the updated presence information is viewable via a second device having a same authorization to view presence information as the mobile device.

16. The system of claim 14, wherein the presence information provided by the mobile device is updated upon at least one of: an immediate basis, periodic interval, intermittent interval, and manual request.

17. The system of claim 14, wherein the presence information is updated on the mobile device upon at least one of: an immediate basis, periodic interval, intermittent interval, and a manual request.

18. The system of claim 13, wherein a database of the mobile device is updated on any changes to the presence information of the at least one subscriber on at least one of: an immediate basis, periodic interval, intermittent interval, and manual request.

19. A method for dynamic updating of presence information in a communications system, comprising:
  sending presence information from a mobile device to a presence server for distribution to one or more mobile devices of at least one subscriber that is listed in an address book of the mobile device; and
  automatically receiving, at the mobile device, updated presence information of one or more subscribers listed in a network address book from the presence server, the updated presence information being obtained by the presence server from at least one mobile device of the one or more subscribers that is determined by a network address book server that stores the network address book as capable of transmitting the updated presence information to the presence server.

20. The method of claim 19, wherein the sending includes sending the presence information to indicate that a user of the mobile device is unavailable to communicate with the at least on subscriber in response to a communication ability of the mobile device being impaired by a low battery condition or a low signal strength condition of the mobile device.

* * * * *